(12) United States Patent
Kataoka et al.

(10) Patent No.: US 6,667,741 B1
(45) Date of Patent: Dec. 23, 2003

(54) IMAGE GENERATING DEVICE AND IMAGE GENERATING METHOD

(75) Inventors: Hiroshi Kataoka, Tokyo (JP); Syuji Takahashi, Tokyo (JP); Hideya Shibazaki, Tokyo (JP)

(73) Assignee: Kabushiki Kaisha Sega Enterprises, Tokyo (JP)

(*) Notice: Subject to any disclaimer, the term of this patent is extended or adjusted under 35 U.S.C. 154(b) by 0 days.

(21) Appl. No.: 09/582,343
(22) PCT Filed: Dec. 21, 1998
(86) PCT No.: PCT/JP98/05880
§ 371 (c)(1), (2), (4) Date: Sep. 25, 2000
(87) PCT Pub. No.: WO99/34333
PCT Pub. Date: Jul. 8, 1999

(30) Foreign Application Priority Data

Dec. 24, 1997 (JP) ............................................. 9-355893

(51) Int. Cl.⁷ .............................................. G06T 15/60
(52) U.S. Cl. ......................... 345/426; 345/427; 463/32; 348/208.14
(58) Field of Search ................................ 345/426, 473, 345/427, 419; 434/247; 463/32, 31, 23, 7, 1, 43; 348/208.14

(56) References Cited

U.S. PATENT DOCUMENTS 5,577,981 A * 11/1996 Jarvik ......................... 434/247
5,616,031 A * 4/1997 Logg ........................... 345/426
5,977,978 A * 11/1999 Carey et al. ................. 345/419
6,234,901 B1 * 5/2001 Nagoshi et al. ............. 345/426

FOREIGN PATENT DOCUMENTS

| JP | 64-26274 | 1/1989 |
| JP | 5-303623 | 11/1993 |
| JP | 6-139369 | 5/1994 |
| JP | 8-106549 | 4/1996 |
| JP | 9-44700 | 2/1997 |

* cited by examiner

Primary Examiner—Matthew C. Bella
Assistant Examiner—Kimbinh T. Nguyen
(74) Attorney, Agent, or Firm—Finnegan, Henderson, Farabow, Garrett & Dunner, L.L.P.

(57) ABSTRACT

The brightness of the image of a character displayed on a screen is consistently kept optimum even if the view point of a camera is changed, and the image of the character is appropriately shaded and three-dimensional since such shading is characteristic of a game program. The position of a virtual light source is changed with a change of the position of the view point of the camera. The image processing device includes a feature which changes the position of the view point of the camera, a feature which changes the position of the virtual light source with a change of the position of the view point of the camera, and a feature which subjects the image data of when an object is viewed from the view point of the camera to shading of when the virtual light from the light source is projected to the object.

13 Claims, 7 Drawing Sheets

(a)          (b)

FIG.7
(a)
(b)
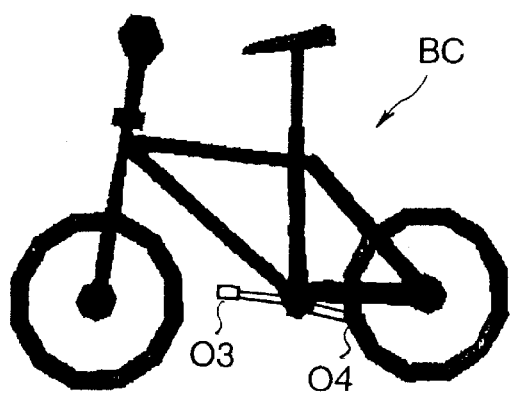
(c)
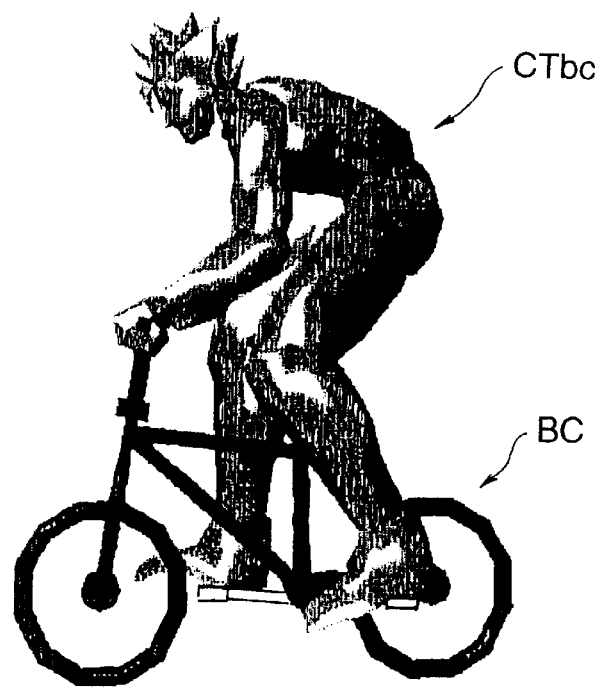

IMAGE GENERATING DEVICE AND IMAGE GENERATING METHOD

TECHNICAL FIELD

This invention relates to an image generating apparatus and an image generation method, and more particularly to an image generating apparatus and image generation method, suitable for game apparatuses, for generating images wherewith characters (objects) moving within virtual three-dimensional space are easy to see on the screen and can express real motion.

BACKGROUND ART

With the developments in computer graphics technology in recent years, simulation apparatuses and game apparatuses have come to be widely and extensively used, both commercially and in the home. There are various categories of game apparatus. One among these is the battle game apparatus wherewith characters act out battles in virtual game space (virtual three-dimensional space) in response to control information from players. The popularity of these battle game apparatuses continues to be very strong.

These game apparatuses usually comprise a main console that accommodates a computer unit for executing a game program, a control unit for sending control signals to the main console which directs characters (objects) represented in the game to move, a monitor for displaying images associated with the development of the game resulting from the execution of the game program in the main console, and an audio unit for generating sounds associated with that game development.

In such battle games, virtual camera positions are variously changed from scene to scene and game data are generated so that the battle scenes viewed by the players are made more dramatic and so that the sense of participation in the game is enhanced. By the same token, light sources from lighting or the sun are set at prescribed positions in the virtual three-dimensional space in order to impart a three-dimensional feeling and sense of realism to the characters playing out the battle. In many applications, it is assumed that light shining from those light source positions strikes the characters, and shadow processing is effected according to the angles of those light sources.

In previous battle games, programs are fashioned so that characters act out battles using their own arms and legs. More recently, however, games are being provided which portray characters that use swords or other weapons.

There are also games in which, in the game apparatus, characters race on skateboards, bicycles, or motorcycles. These games differ from games like automobile race games which simulate the movements of individual single objects (automobiles) in that an object that appears as one is made up of a plurality of subordinate objects, whereupon that plurality of subordinate objects must be simulated simultaneously. In the case of a character riding a bicycle, for example, the object is made up of a bicycle traveling over a road and a character that is pedaling while riding that bicycle. In terms of the image data for such characters riding bicycles, the position of the buttocks of the character is taken as the reference position, for example, image data (polygon data) for each part of the character are computed from that reference position, image data (polygon data) for each part of the bicycle are computed from that buttocks reference position, and simulation is performed which treats both sets of data as combined image data. The reference position may be set at some part of the bicycle, for example, and not just in the character.

Nevertheless, in conventional game apparatuses, problems pointing up needed improvements have been pointed out, as described below, respecting the ease of viewing the images displayed in the battle game as a game, and the sense of realism in games such as bicycle races wherein the objects are comprised of a plurality of subordinate objects.

The first problem relates to a conventional battle game. This problem involves the relationship between the positions of the light sources and the positional control of the virtual camera (point of view) effected in order to allow a player to view the battle scenes from a variety of viewpoints. In the conventional case, the light sources are fixed in the virtual three-dimensional space, wherefore light strikes all of the objects from the same direction. Thus it is possible to effect real shadow processing that results in a sense of uniformity.

It sometimes happens, however, that changing the position of the virtual camera results in a back-lighted relationship between the light source and the camera positions. The sense of three-dimensionalism is better elicited by adding shadows to some extent, whereupon, when processing is done to effect such shadows, if back-lighting occurs, the shadow will be imparted to the entire character, and the character as displayed on the screen will be displayed so that it looks very dark in its entirety. This results in a screen that is very difficult for a player to view.

In battle games, in particular, where players need to clearly apprehend their own and their opponents' characters, the dark display of characters actually becomes a negative factor in terms of enhancing the operability of and interest in the game. This negative factor is a serious problem in battle games where the emphasis is more on battle content than on the atmosphere produced by the entire screen.

Game apparatuses have also been provided in the past which do not employ the technique of processing shadows using established light sources, but the characters expressed in such games lack a sense of three-dimensionalism, and the display screens produce little impact.

The second problem relates to game apparatuses in cases such as the bicycle race described earlier wherein there are multiple subordinate objects simulated in the same object. In the case of a bicycle race, for example, the image data (polygon data) for the positions of the objects (positions of characters and positions of bicycles) are computed from reference positions established at the positions of the buttocks of the characters, for example. Hence there is no particular problem if the two objects (character and bicycle) are moving in the same way, but when they each move differently, the following difficulties are encountered.

The behavior of the character itself on the bicycle is usually unrelated to the road condition. To make the bicycle go faster, for example, the character pedals while standing up and moving his weight forward, and when climbing a hill will pedal the bicycle while moving his body back and forth from side to side. Thus, when computing image data for each part of the bicycle according to the reference position of the character, for example, because the reference position for computing image data for the parts of the bicycle is in the character, the movement of the character body will not always be in mutual synchronization with the road condition. When the road surface is uneven, for example, the points where the wheels strike the ground are forcibly set above the road surface by contact judgments, and the character data are controlled separately by control information, etc., without the influence of the road surface irregularity being reflected in the character data. As a consequence, the movements of the two entities will be off, with the character pumping the bicycle while elevated above the bicycle, for example, or, conversely, with the body of the character appearing below the saddle, resulting in an unnatural image that lacks realism.

The cause of this is that there are two or more independently moving subordinate objects in the one object, and the same problem arises when the reference position is placed in the bicycle.

With respect to this problem, it might be possible to conceive of a technique whereby the reference position is determined outside the object, and image data for the positions of the parts of the object computed from that reference position. That technique, however, would require such an enormous volume of computations as to make it altogether impracticable as things now stand, and hence can hardly be adopted in a game apparatus.

DISCLOSURE OF THE INVENTION

A first object of the present invention, which was devised for the purpose of overcoming the unresolved problems in the game apparatuses described in the foregoing, is to provide screens of character images subjected to shadow processing to provide a sense of three-dimensionalism suitable to games, wherewith the brightness of the characters displayed on the screen is always maintained optimally, even when the camera viewpoint is changed.

A second object of the present invention is to provide a technique for producing and displaying image data that correctly and realistically displays the way multiple subordinate objects move in relationship to one another, even when there are two or more subordinate objects moving independently inside one object, by comparatively simple image generation processing.

A third object of the present invention is to realize the first and second objects noted above in a battle game that handles data when there are two or more subordinate objects moving independently inside one object.

A first invention for realizing the objects stated above is an image generating apparatus for generating image data for objects while altering the line of vision from the camera viewpoint for objects moving in virtual three-dimensional space, characterized in that the position of a virtual light source is altered in response to alterations in the position of the camera viewpoint.

Preferably, means for altering the position of the camera viewpoint, means for altering the position of the virtual light source in response to alterations in the position of the camera viewpoint, and means for imparting shadow processing to image data when the object is viewed, when a virtual light beam from the light source is directed onto the object, are comprised.

Even more preferably, the means for altering the light source position are means for imparting a certain three-dimensional distance differential between the positions of the camera viewpoint and of the virtual light source. Also, the means for altering the light source position may, for example, be means for determining the three-dimensional distance differential in dependence on one formula. Furthermore, the means for imparting shadow processing may, for example, be means for subjecting only the object to the shadow processing.

A second invention is an apparatus for generating image data for objects that move in virtual three-dimensional space, wherein the objects are made up of multiple subordinate object bodies that manifest mutually independent movements, comprising means for producing and separately storing image data for the multiple subordinate object bodies beforehand, and means for separately reading out, positioning, and displaying the image data for the multiple subordinate object bodies according to the situation.

Preferably, the means for producing and storing the image data are means for producing the image data for the multiple subordinate object bodies on the basis of a common reference position, and separately storing the same. Preferably, moreover, the image display means are means for positioning the multiple image data using the reference position.

As a preferred mode, furthermore, the multiple subordinate object bodies are one character that functions as a subordinate object body, and an ancillary body that functions as another subordinate object body attaching to that character and used by that character. For example, the character might be a character portraying a fighter and the ancillary body a bicycle.

A third invention is an image generation method for generating image data for objects while altering the line of vision from the camera viewpoint for objects moving in virtual three-dimensional space, characterized in that the position of the camera viewpoint is altered, and the position of a virtual light source is altered in response to those alterations in the camera viewpoint.

BRIEF DESCRIPTION OF THE DRAWINGS

FIG. 7 is a diagram for explaining separate image data for the fighter and bicycle, and for explaining the way they are synthesized, in animation mode.

BEST MODE FOR CARRYING OUT THE INVENTION

First Embodiment

Figure 1:
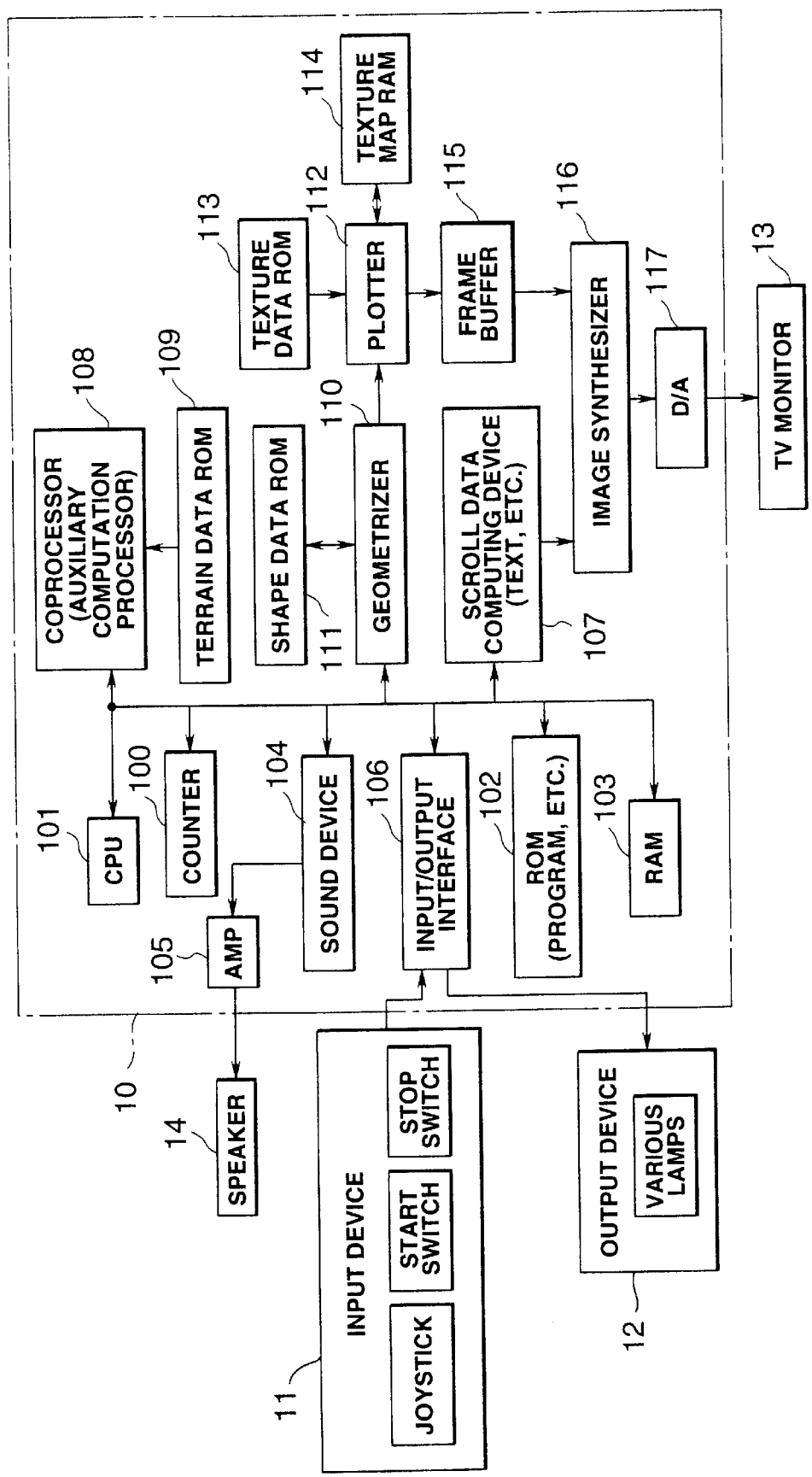
FIG. 1 is a block diagram representing the configuration of a game apparatus relating to a first embodiment of the present invention.

A first embodiment is now described with reference to the drawings. The game apparatus diagrammed in FIG. 1 is one aspect of an embodiment of the image generating apparatus and image generation method relating to the present invention, being an apparatus for embodying a battle game.

This battle game is devised such that at least one of the characters who appear is a fighter who rides a bicycle which is an ancillary entity. The fighter riding on this bicycle is designed so that, during the game, he uses that bicycle (which is an ancillary entity) as a battle weapon. The fighter (character: subordinate object body) and the ancillary entity (bicycle) correspond to the objects in the present invention.

This ancillary entity, moreover, is not limited to a bicycle, and may be something else, such as a sword, a spear, or other weapon, or a vehicle such as a skateboard, for example.

In terms of its basic elements, this game apparatus comprises a game processing board 10, an input device 11, an output device 12, a TV monitor 13, and a speaker 14.

The input device 11 comprises a joy stick, a start switch, and a stop switch. The output device 13 comprises display instruments such as various display lamps. The TV monitor 13 displays images of the battle game. A projector may be used instead of the TV monitor.

The game processing board 10 comprises a counter 100, a CPU (central processing unit) 101, ROM 102, RAM 103, sound device 104, input/output interface 106, scroll data processor 107, coprocessor 108, terrain data ROM 109, geometrizer 110, shape data ROM 111, plotter 112, texture data ROM 113, texture map RAM 114, frame buffer 115, image synthesizer 116, and D/A converter 117.

Among these, the CPU 101 is connected, via a bus line, to the counter 100 which counts down from an initial value, the ROM 102 wherein are stored a prescribed program and image processing programs, the RAM 103 that stores computation data, the sound device 104, the input/output interface 106, the scroll data processor 107, the coprocessor 108, and the geometrizer 110. The RAM 103 is made to function as a buffer, and is used for writing various commands to the geometrizer (object display, etc.) and for writing data required during various computations inclusive of conversion matrix computations.

The input/output interface 106 is connected to the input device 11 and the output device 12, and various control signals from the input device 11 as well as detection signals are fetched as digital quantities to the CPU 101. Signals generated by the CPU 101, etc., can be supplied to the output device 12. The sound device 104 is connected to the speaker 14 via a power amplifier 105. Thereby, audio signals generated by the sound device 104 are power-amplified and output as audio from the speaker 14.

Figure 2:
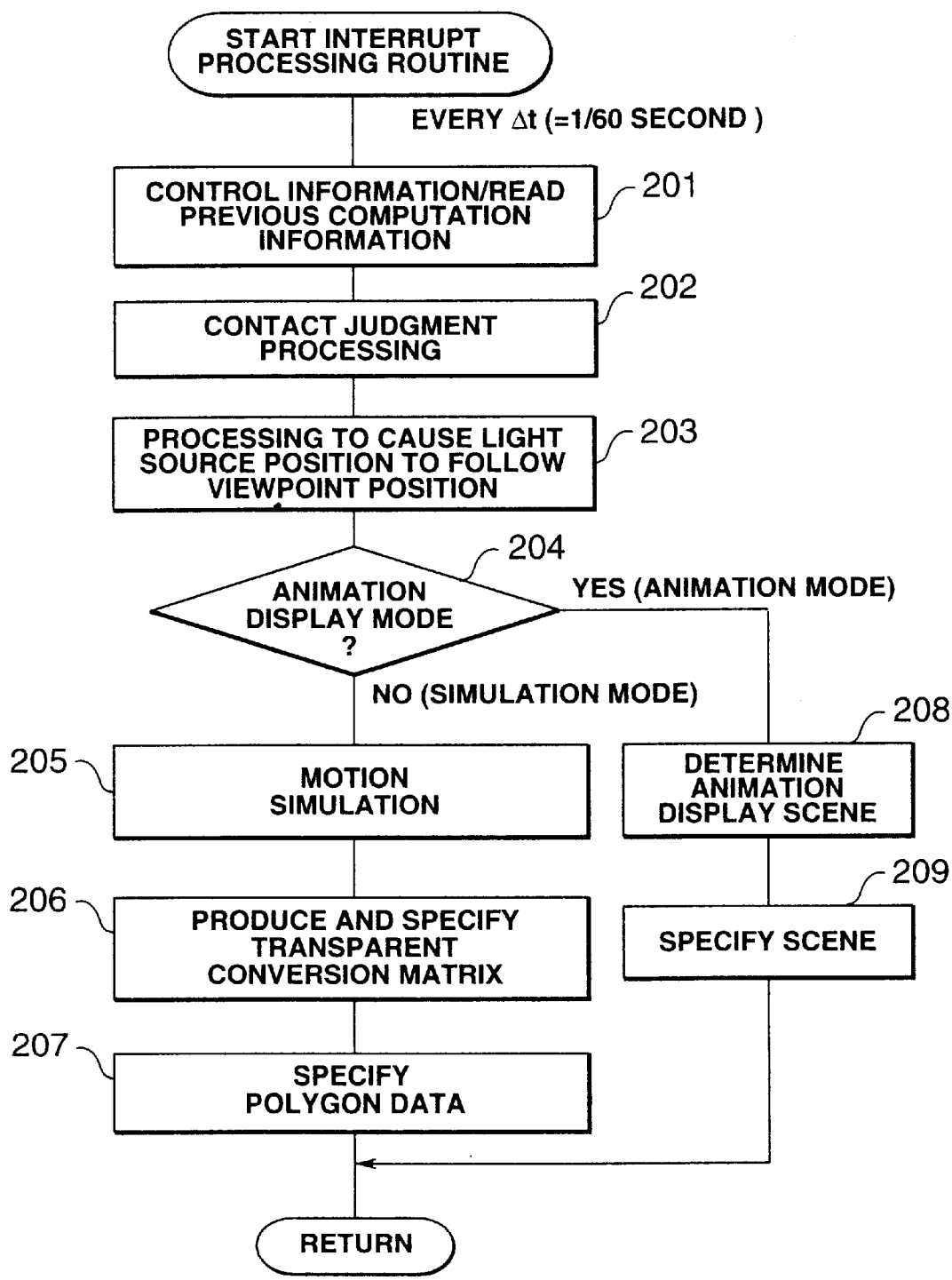
FIG. 2 is a flowchart that summarizes the process flow executed by a CPU in the first embodiment.

The CPU 101, according to the program contained in the ROM 102, reads in control signals from the input device 11, terrain data from the terrain data ROM 109, and shape data (three-dimensional data such as "objects made up of fighters (characters) and bicycles, etc." and "background made up of road surfaces, terrain, sky, spectators, and various structures such as a stage") from the shape data ROM 111, and sequentially executes the prescribed processing routines diagrammed in FIG. 2. In other words, the CPU 101 performs processing to judge contact between objects and the floor, the control of virtual light source position following associated with the movement of camera viewpoint relating to the present invention (where "following" means positionally following the camera viewpoint in a state wherein the virtual light source is removed a certain distance or by a certain angle), object motion computations (simulation), and computations for various kinds of special effects processing. The motion computations also include instructions for animation display processing performed according to the game situation.

The motion computations are such that different processing is performed in the "simulation mode" and in the "animation mode." The processing and display of image data by the combination of these two modes are unique to this embodiment.

When the "simulation mode" is in effect, control signals of a player from the input device 11 are used to simulate object movements or motion in virtual three-dimensional space (game space). In order to carry this out, after determining coordinate values of polygons for objects in the virtual three-dimensional space, a conversion matrix and shape data (polygon data) are specified in the geometrizer 110 to convert those coordinate values to a two-dimensional field of vision coordinate system. The terrain data ROM 109 is connected to the coprocessor 108, and predetermined terrain data are passed to the coprocessor 108 and CPU 101. The coprocessor 108 is configured so that it primarily takes on floating decimal point computations during the judgment of contact between terrain and object and object motion computations. Thus the CPU processing load can be reduced.

The "animation mode," on the other hand, is a mode wherein, primarily, image data to be displayed are produced and stored in memory beforehand, wherefrom image data intended for each scene are selected and displayed. However, making it possible to combine this with minor simulation processing such as for causing a hand to wave in response to a control signal is also within the scope of the animation mode.

In this embodiment, in particular, at least one character (fighter) is employed who is a character riding a bicycle which is an ancillary object body, but the image data for the character itself and image data for the bicycle functioning as an ancillary object body, in the animation mode, are produced beforehand with a common reference position and stored in the shape data ROM 111. These character and bicycle image data, in one example, are produced beforehand with polygons as three-dimensional data seen from a prescribed line of sight direction.

These character and bicycle image data are selected by the geometrizer 110, and those two entities are displayed positionally coordinated and superimposed.

The geometrizer 110 is connected to the shape data ROM 111 and to the plotter 112. In the shape data ROM 111, as already noted, shape data (data for vehicles, terrain, and background, etc., formed of three or more apexes) made up of pluralities of polygons are stored beforehand. These shape data are passed to the geometrizer 110.

The geometrizer 110, when the simulation mode is in effect, performs transparent conversion of designated shape data using a conversion matrix designated by the CPU 101, and obtains shape data converted from the coordinate system in the three-dimensional virtual space to the field of vision coordinate system. Furthermore, in the simulation mode, the bicycle image data are handled equivalently with data for parts of the body of the character (fighter). In other words, in this case, in one object made up of character and bicycle, a moving subordinate object is one of the whole.

When the animation mode is in effect, the geometrizer 110 reads out image data for the character and the bicycle separately from the shape data ROM 111, according to information necessary for the animation display ordered by the CPU 101, performs transparent conversion on the designated shape data using a conversion matrix specified by the CPU 101, and obtains shape data converted from the coordinate system in the three-dimensional virtual space to the field of vision coordinate system. Image data are then produced wherein those entities are positionally coordinated, and sent to the plotter 112. When this animation mode is in effect, separately moving subordinate object bodies are configured for the character (fighter) and the bicycle, and one object is configured by both of those entities.

The plotter 112 applies texture to the converted field of vision coordinate system shape data and outputs to the frame buffer 115. In order to be able to perform this texture application, the plotter 112 is connected both to the texture data ROM 113 and the texture map RAM 114, and is also connected to the frame buffer 115. This plotter 112 is designed so that, during the prescribed texture application processing, it also performs the shadow processing that is a feature of the present invention which will be described subsequently.

The term polygon data refers to groups of coordinate data that are relative or absolute coordinates of the apexes of polygons (mainly triangles and quadrangles) consisting of sets of three or more apexes. In the terrain data ROM 109 described earlier are stored polygon data that are set comparatively roughly such as will suffice in carrying out the prescribed judgments (contact judgments, etc.). In the shape data ROM 111, in contrast therewith, are stored polygon data that are set more precisely for shapes that configure screens for characters and background, etc.

The scroll data processor 107 computes scrolling screen data (stored in the ROM 102) such as text. This processor 107 and the frame buffer 115 communicate with the TV monitor 13 via the image synthesizer 116 and the D/A converter 117. Thus polygon screens of characters, ancillary subordinate object bodies, and terrain (background), etc., stored temporarily in the frame buffer 115 (resulting from simulation or animation synthesis) and scrolling screens of text information pertaining to the progress of the game are synthesized according to designated priorities, and final image data are generated for every frame and every certain display interrupt. These image data are converted to analog signals by the D/A converter 117, sent to the TV monitor 13, and displayed in real time as game screens.

(Effects)

Image generation processing relating to battle games based on the game apparatus of this embodiment is described next.

In FIG. 2 are diagrammed image generation processing routines that are executed at interrupts synchronized with display interrupts. These routines are repeatedly executed by the CPU 101 for each field (1/60 second) synchronized with the display interrupts, for example.

First, the CPU 101 reads in control information of a player detected by the input device 11 and computation information computed during the previous interrupt (step 201). Included in the control information are the joystick angle and direction, etc., manipulated by the player. Included in the computation information are such data as the position and motion information for the player's character and an opponent character, and virtual light source information (described subsequently), processed by the CPU 101. One's own character is set so that it can be simulated by the CPU 101 according to the control information, but the enemy character is simulated independently by the CPU 101 according to a previous program routine.

Next, processing for the characters and floor-contact judgment processing etc. during the current interrupt are executed based on this information and on the computation information (positions of one's own character and enemy character, etc.) from the previous interrupt (step 202).

Next, processing is executed for following the spatial positions of the virtual light source from a certain spatial distance (angle) as the position of the camera viewpoint is altered (step 203). This following processing is described in FIGS. 3 to 5.

Figure 3:
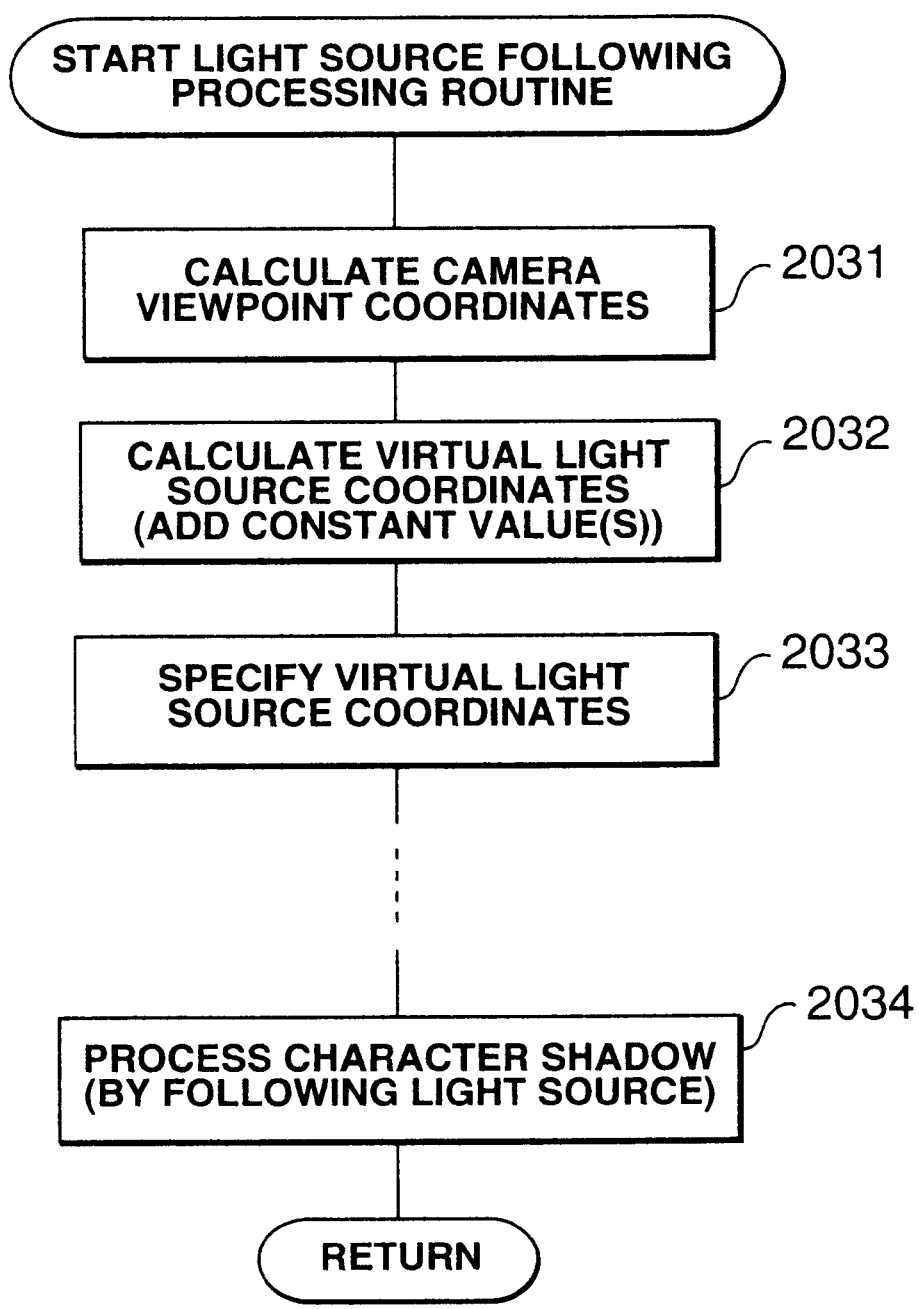
FIG. 3 is a flowchart summarizing a light source following subroutine in the first embodiment.

As indicated in FIG. 3, at every interrupt, the routines in steps 2031 to 2035 are executed. Initially, a new coordinate position (position in virtual three-dimensional space) is calculated for the virtual camera viewpoint (step 2031). This calculation is done in a predetermined order at the positions where one's own character and the enemy character both come into the field of view simultaneously, according to movement information for those two characters. Also, immediately after the battle has been decided (when shadow processing is done for the characters, however), when the condition is such that the CPU 101 automatically moves the camera viewpoint according to the program, independently of the controls of the player, that movement information becomes the position of the camera viewpoint.

Next, the following position of the virtual light source is calculated (step 2032). For this calculation, there is the method of adding certain numerical values $\alpha x$, $\alpha y$, and $\alpha z$ (that is, values in the dimensions of the x axis, y axis, and z axis in the virtual three-dimensional space) to the camera viewpoint coordinates. Because of the relationships involved in performing shadow processing on the characters, there must be a constant angle between the camera line of sight and the light shown from the light source. In order to maintain that constant angle, the fixed values $\alpha x$, $\alpha y$, and $\alpha z$ may be suitable set beforehand. In addition to the following method described above, the procedure of calculating turning angles of directions associated with the movement of the camera viewpoint and rotating the light source coordinates by those angles is also possible.

When the virtual light source has been determined in this manner, the CPU 101 outputs this coordinate information via the geometrizer 110 to the plotter 112 (2033).

The plotter 112, in the plotting processing prescribed therefor, executes shadow processing, according to the virtual light source following position, only for one's own and the enemy characters (2034).

Figure 4:
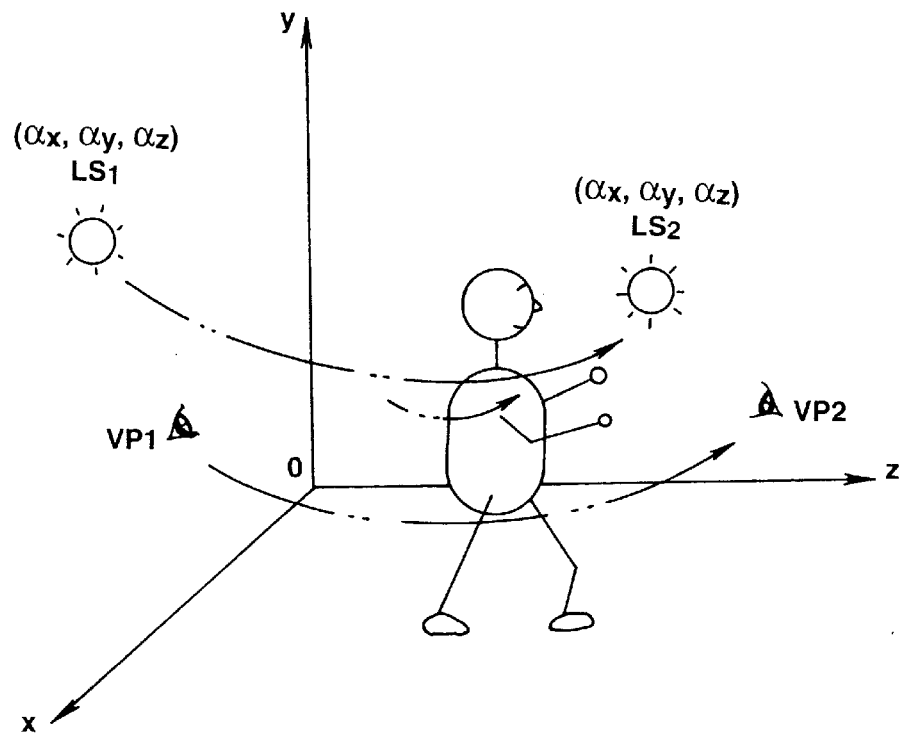
FIG. 4 is a diagram for explaining the concept of light source following processing.
Figure 5:
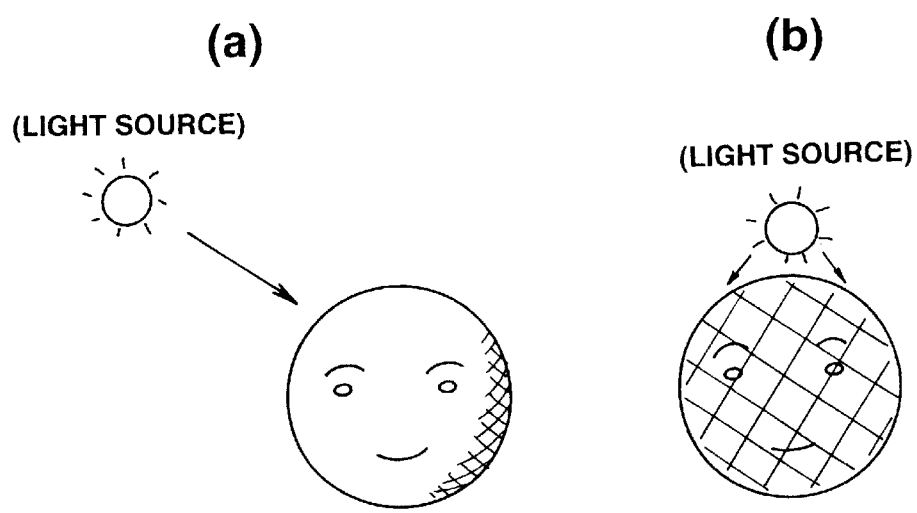
FIG. 5 is a diagram for explaining the benefits of shadow processing associated with light source following processing in comparison with a conventional example.

For this reason, when the camera viewpoint changes from the position at point VP1 to that at point VP2 in FIG. 4, for example, the position of the virtual light source is automatically altered from the position at point LS1 to that at point LS2 in FIG. 4. The point LS1 exhibits a constant angular difference relative to the point VP1 determined by the constant values $\alpha x$, $\alpha y$, and $\alpha z$, and the same is true of the point LS2 relative to the point VP2. Accordingly, the character displayed will be provided with a suitable shadow, as diagrammed in FIG. 5(a), according to the angular difference that is always held constant between the camera viewpoint and the virtual light source. That is, no matter where the camera viewpoint moves, the entire character can be definitely prevented from becoming a dark display due to a back-lighted condition as diagrammed in FIG. 5(b).

Thus, when the camera viewpoint is altered, the position of the light source follows at a constant distance or by a constant angle, so that shadow processing can be performed, for the character, that is always constant and stable. As a result, the character will not be displayed in a condition such that the whole becomes dark, even when back-lighted, and the screens are very easy for the player to view, especially in battle games. The player can clearly apprehend the opponent character and his own character on the screen, so a positive factor is realized in terms of enhancing operability and game interest.

Furthermore, such shadow processing involving a moving and following light source is only applied to the characters, wherefore this game feature enhancement is limited to a portion of the game, and no unnaturalness will be felt toward changes in the light source position in the road surface or background.

Returning to FIG. 2, the game processing from step 204 on is now described.

When the light source following processing described in the foregoing is finished, the CPU 101 makes a decision as to whether or not the display mode should be the animation mode (step 204). This decision is made on the basis of simulation results from the previous interrupt for the character and on player control information. The scenes in which this animation mode display is performed include, for example, scenes such as when the battle has been decided, the game is ending, and a "fighter riding his bicycle," who is the winning character, leaves the scene of battle.

When the decision in this step 204 is NO, it can be recognized that the "simulation mode" display will be performed which performs ordinary game simulation.

Thereupon, the motions of one's own and the enemy characters reflecting the control information and contact judgments are computed (step 205), a transparent conversion matrix is produced and designated (step 206), and the polygon data, etc., required for the depiction is designated (step 207). Thereby, image data are updated for each interrupt, and the images associated with the development of the battle game are displayed on the TV monitor 13 together with other (text) information.

Figure 6:
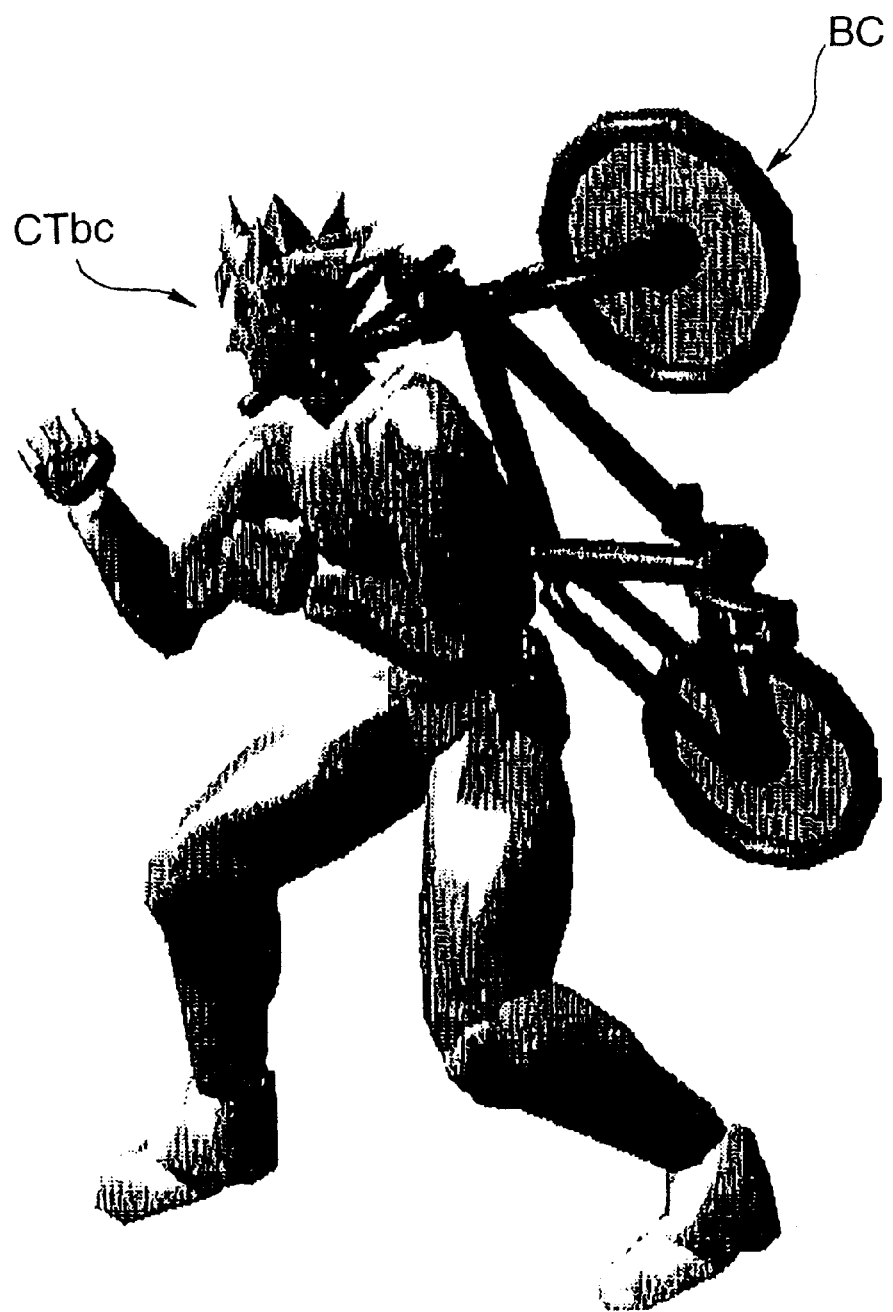
FIG. 6 is a diagram for explaining the positional relationship between a fighter and a bicycle in simulation mode.

In this simulation mode, furthermore, as diagrammed in FIG. 6, in the image data (polygon data) for the bicycle BC, for the fighter (character) CTbc riding on the bicycle, the behavior thereof is computed in the same manner as arm and leg image data, as a part of the image data for the character CTbc itself.

Thus the player can make further desired control inputs from the input device 11 while viewing the display screen, and can conduct the battle game between his own character and the enemy character manipulated by the CPU or another player.

When the decision in step 204 is YES, on the other hand, the display designation processing of the "animation mode" relating to steps 208 and 209 is executed. Assume, for example, that the scene requiring this animation mode display is the scene where the fighter FTbc displayed in FIG. 6 is leaving, riding on his bicycle BC, after the game has ended.

When it has been decided that this scene will be displayed in the animation mode, the CPU 101 determines this leaving scene (step 208), and specifies this scene information in the geometrizer 110 (step 209).

The geometrizer 110 responding thereto separately reads out polygon data corresponding to that specified scene (including line of sight direction information) for the fighter and the bicycle from the shape data ROM 111.

As diagrammed in FIGS. 7(a) and 7(b), for example, the fighter (character) FTbc, assuming a bicycle pumping attitude, is polygon data wherein the leg positions are different in each cut, and the bicycle BC is polygon data wherein the pedals turn with each cut. Both sets of these image data are produced beforehand for each scene and each cut, and stored in the shape data ROM 111. Not only so, but positions are determined that become references when the images are synthesized and displayed in both sets of these image data, and data are produced which are matched to those reference positions. In the fighter FTbc in FIG. 7(a), the bottom surface positions 01 and 02 of both feet are reference positions, while in the bicycle BC in FIG. 7(b), the positions 03 and 04 of the left and right pedals, respectively, are reference positions.

The geometrizer 110 converts the individual polygon data for the fighter FTbc and bicycle BC read out to two-dimensional field of vision coordinates in the same manner as when in the simulation mode, and, further, synthesizes the two-dimensional data for the individual subordinate object bodies converted, matching those data to the reference positions 01 and 02, and 03 and 04, respectively. When this synthesis is being done, priority processing is performed between the two sets of image data for the character FTbc and the bicycle BC, and the data visible on the front side are given priority.

Thus the respective images in FIGS. 7(a) and 7(b) are synthesized to the image exemplified in FIG. 7(c), and image data for the fighter FTbc mounted on his bicycle BC with his buttocks raised are produced. These image data are displayed together with the background. By effecting this series of image synthesis and displays at every interrupt, a scene is displayed where, for example, the character riding the bicycle leaves while pumping the bicycle.

Thus, when two subordinate object bodies exhibiting independent motion are displayed, images for those two subordinate object bodies can be produced beforehand relative to common references, read out separately when they are to be displayed, and a synthesized display effected. During such displays, synthesis is effected so that the original common reference positions again coincide (done with positioning, in other words), wherefore there is no discrepancy in behavior between the two subordinate object bodies. Therefore, even if the road surface is irregular, there will no longer be any unnaturalness such as the body of the fighter rising too far above the bicycle or, conversely, of the body of the fighter descending below the bicycle saddle. Even if there are irregular changes in the road surface, the distance between the fighter (character) and the bicycle will be maintained such that there will be almost no discrepancy, any sense of awkwardness is eliminated from scenes of the character riding away on the bicycle, and more real and natural images can be presented.

In the game apparatus of this embodiment, furthermore, when the fighter is riding the bicycle, that is, when the mode wherein two moving subordinate objects are made into images of one object and assigned to the animation mode, processing is performed in a mode other than the simulation mode, but this technique is also effective for roll playing games (RPGs).

In the light source following control of the embodiment described in the foregoing, moreover, the way in which the virtual light source is made to follow may be as described below. This is a technique wherein, for example, the camera viewpoint coordinates are calculated from the character movement condition, and the coordinates resulting when constant numerical values are added to those coordinate values are treated as the coordinates of the virtual light source. There is also a mode wherein information on character movement conditions is processed on the basis of control information from a player, and there is a mode wherein that information is computed automatically according to predetermined procedures by a CPU in the apparatus.

Second Embodiment

A game apparatus relating to a second embodiment of the present invention is now described with reference to FIG. 8. The hardware configuration of the game apparatus in this second embodiment is the same as that in the first embodiment described in the foregoing. The game content in this game apparatus also constitutes a battle game wherein one of the characters portrayed is a fighter who rides a bicycle and uses that bicycle as a weapon when fighting.

The processing executed by the CPU in the first embodiment is divided between a simulation mode and an animation mode. In this embodiment, however, the "technique for generating image data for an object made up of two or more moving subordinate objects" is not necessarily limited to such an embodiment, and a configuration such as that described below is possible in this second embodiment.

That is, the CPU 101 in the game apparatus is a CPU that continuously executes image generation processing in a certain flow, so that the "technique for generating image data for an object made up of two or more moving subordinate objects" relating to the present invention is implemented in that processing.

Figure 8:
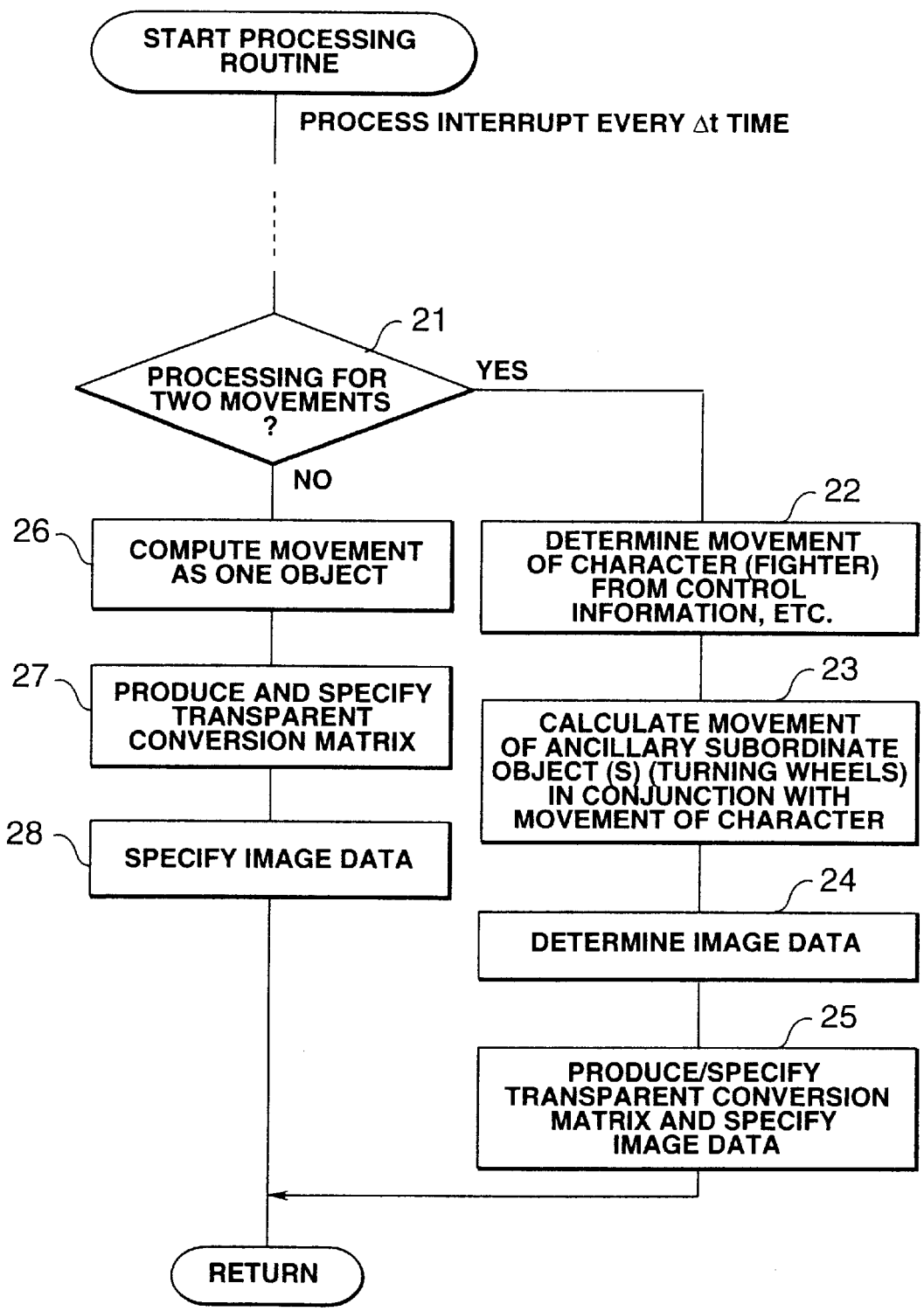
FIG. 8 is a flowchart that partially summarizes the process flow executed by a CPU in a second embodiment.

The general processing flow executed by the CPU 101 is represented in part in FIG. 8. These processing routines are performed after the CPU 101 has read in control information from a joystick or the like from a player and the computation information from the previous interrupt, executed contact judgment processing, and performed processing so that the virtual light source follows the viewpoint camera.

The CPU 101 determines whether or not the fighter has placed the bicycle on the road surface from the control information, etc. (step 21 in FIG. 8). That is, in order to change the processing from one object exhibiting only one movement (of the fighter fighting, using the bicycle as a weapon) to one object exhibiting two movements (of the fighter (body) himself and the bicycle), the point in time when the bicycle is placed on the road surface is determined. When it has been determined in this determination that the bicycle has been placed on the road surface (YES), that point in time marks the boundary at which a change is made from handling the object exhibiting one movement up to that point, based on the control information, to handling the object exhibiting two movements.

Next, the CPU 101 determines the movement (motion) of the fighter according to the content of the control information (step 22). The movements that can be commanded here may be of one type of a plurality of types. Some examples would be that of the fighter riding on the bicycle and jumping, or standing upside down on the bicycle, or waving his hand. It is assumed that a jump, for example, has been determined by the processing in this step 21.

Next, the CPU 101 can determine the movement of the bicycle jumping while positionally coordinated with the jumping fighter (step 23). When the movements of both the fighter and bicycle have been determined in this manner, image data (polygon data) are determined which should be selected during the delineation, according to these two movements (step 24).

After that, a transparent conversion matrix is produced on the basis of the line of sight direction matched with a prescribed line of sight direction or movement and specified in the geometrizer 110, and, at the same time, the determined image data are specified in the geometrizer 110 (step 25).

Thus the geometrizer 110, as in the first embodiment, reads out specified image data (polygon data) from the shape data ROM 111 for the fighter and the bicycle, and, as in the embodiment described earlier, transparently converts the image data for both subordinate objects, positionally matches and synthesizes those data, and sends those synthesized data to the plotter 112.

Thus is delineated the fighter jumping while riding the bicycle. In this case, although the movement of the body of the fighter and the movement of the bicycle are separate, real images are obtained wherein there is hardly any discrepancy in the relationship between the position of the fighter body and the position of the bicycle.

If the decision is NO in the procedure in step 21, the movements of one's own and the enemy characters reflecting the control information and the contact judgment results are computed as in conventional simulation (step 26), the transparent conversion matrix is produced and specified (step 27), and image data (polygon data) and the like further necessary to the delineation are specified (step 28). Thus image data are renewed at every interrupt, and image data associated with the development of the battle game are displayed together with other (text) information on the TV monitor 13.

Thus, as based on the second embodiment, while handling the bicycle image data as data for part of the body of the fighter during battles, when the fighter is riding the bicycle, the image data for the bicycle and the fighter's body are handled separately and, in addition, both sets of image data are selected from among data that have been produced beforehand, and generated by positioning and synthesizing. Hence the fighter riding the bicycle is produced in realistic images wherein there is almost no positional aberrance.

In the embodiments described in the foregoing, cases are described wherein a battle game is embodied, but the content relating to the present invention can be embodied without necessarily being limited to battle games. In particular, the processing for generating images relating to the present invention wherein two or more subordinate object bodies are contained in one object will yield the same beneficial effects when embodied in bicycle race games and skateboard games or the like.

When the present invention is embodied in a battle game, the weapon attached as an ancillary subordinate object body to the fighter which is both subordinate object body and character need not be limited to a bicycle, but may be a skateboard, a sword, or the like.

In the embodiments described in the foregoing, moreover, the configuration is such that programs and data are stored beforehand in ROMs 109, 111, and 113, but the configuration may also be such that those programs and data are stored in information storage media such as a CD-ROM or ROM cartridge and supplied to internal memory (RAM) in the apparatus as necessary. The storage medium may also be an information medium such as the internet or personal computer communications.

INDUSTRIAL APPLICABILITY

According to one aspect of the present invention, effectiveness not available conventionally can be manifested, making it possible to provide screens of seemingly three-dimensional character images processed with suitable shadows ideal for games, for example, such that the brightness of the characters displayed on the screens can always be maintained optimally, even when the camera viewpoint is changed, and suitably adding effects to the game, for example, to such degree as will not impair the realism thereof, making it possible to enhance interest in the game and also to facilitate improvements in operability when applied to game apparatuses.

According to another aspect of the present invention, moreover, it is possible to provide an image generating apparatus and image generation method ideal for bicycle race games or battle games employing warriors riding bicycles, wherewith, by comparatively simple image generation processing, even in cases where two or more moving subordinate objects exist in one object, image data can be produced and displayed which suitably and realistically express the way in which those multiple subordinate objects move in relationship to each other.

What is claimed is:

1. An image generating apparatus for generating image data which capture objects moving in virtual three-dimensional space in conjunction with development of a game, comprising:

means for altering camera viewpoint in conjunction with development of said game; and means for altering position of a virtual light source deployed in said virtual three-dimensional space relative to said altered camera viewpoint so that position of said virtual light source does not become back-lighting relative to said camera viewpoint.

2. The image generating apparatus according to claim 1, further comprising:

means for altering position of said camera viewpoint;

means for altering a position of said virtual light source in response to alteration in the position of said camera viewpoint; and means for imparting a shadow processing to image data when said object is viewed, when a virtual light beam from said light source is directed onto said object.

3. The image generating apparatus according to claim 2, wherein said means for altering a light source position are means for imparting a certain three-dimensional distance differential between positions of said camera viewpoint and of said virtual light source.

4. The image generating apparatus according to claim 3, wherein said means for altering said light source position are means for determining said three-dimensional distance differential in dependence on one formula.

5. The image generating apparatus according to claim 2, wherein said means for imparting shadow processing are means for imparting said shadow processing only to said object.

6. A computer-readable information recording medium whereon is recorded a program for causing a computer to function as the image generating apparatus cited in any one of claims 1 through 5.

7. An image generating apparatus that is an apparatus for generating image data for objects that move in a virtual three-dimensional space, wherein said objects are structures made up of multiple subordinate object bodies that manifest mutually independent movements, comprising:

means for producing and separately storing image data for said multiple subordinate object bodies beforehand, wherein said image data for said multiple subordinate object bodies are produced on a basis of a plurality of common reference positions and separately stored; and means for separately reading out, positioning, and displaying said image data for said multiple subordinate object bodies according to a current situation.

8. The image generating apparatus according to claim 7, wherein said image display means are means for positioning said multiple image data using said common reference positions.

9. The image generating apparatus according to claim 7, wherein said multiple subordinate object bodies are comprised of one character that functions as a subordinate object body, and an ancillary body that functions as another subordinate object body attaching to said one character and used by said one character.

10. The image generating apparatus according to claim 7, wherein said character is a character portraying a fighter and said ancillary body is a bicycle.

11. The image generating apparatus according to claim 7, wherein said plurality of common reference positions are established at points of contact between a plurality of subordinate object body image data.

12. A computer-readable information recording medium whereon is recorded a program for causing a computer to function as the image generating apparatus cited in any one of claims 7 through 10 or claim 12.

13. An image generation method for generating image data for objects while altering a line of vision from a camera viewpoint for objects moving in a virtual three-dimensional space, comprising the steps of:

altering a position of said camera viewpoint; and altering a position of a virtual light source deployed in said virtual three-dimensional space relative to said altered position of said camera viewpoint so that the position of said virtual light source does not become back-lighting relative to said camera viewpoint.

* * * * *